June 7, 1955  R. HOTTIAUX  2,709,821
SEMI-AUTOMATIC CONTROL DEVICE FOR THREADING MACHINES
OF THE OPENING HEAD TYPE AND THE LIKE
Filed March 24, 1952  4 Sheets-Sheet 1

INVENTOR
ROLAND HOTTIAUX
By Linton and Linton
ATTORNEYS

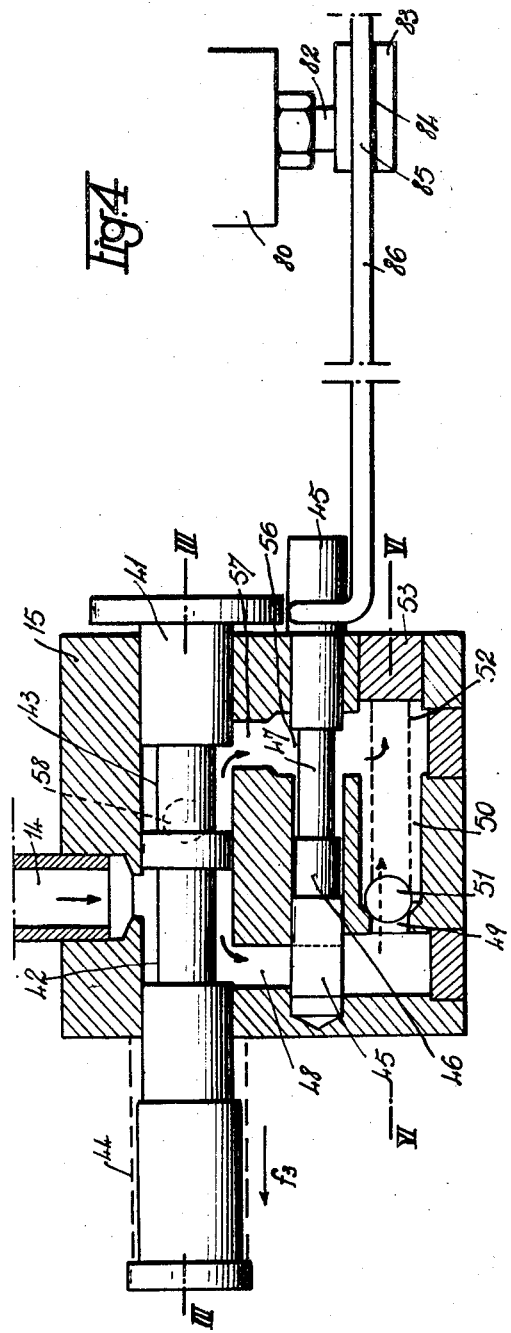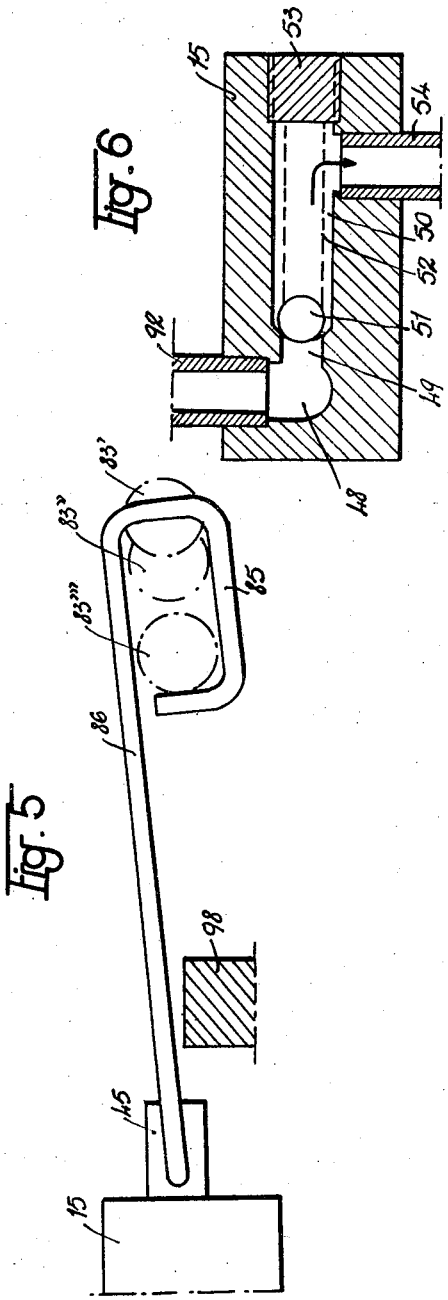

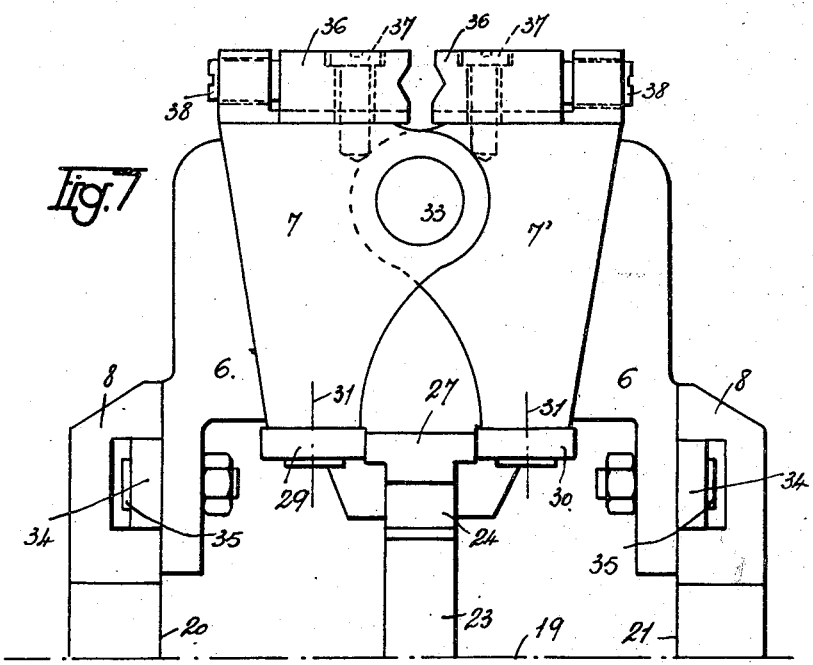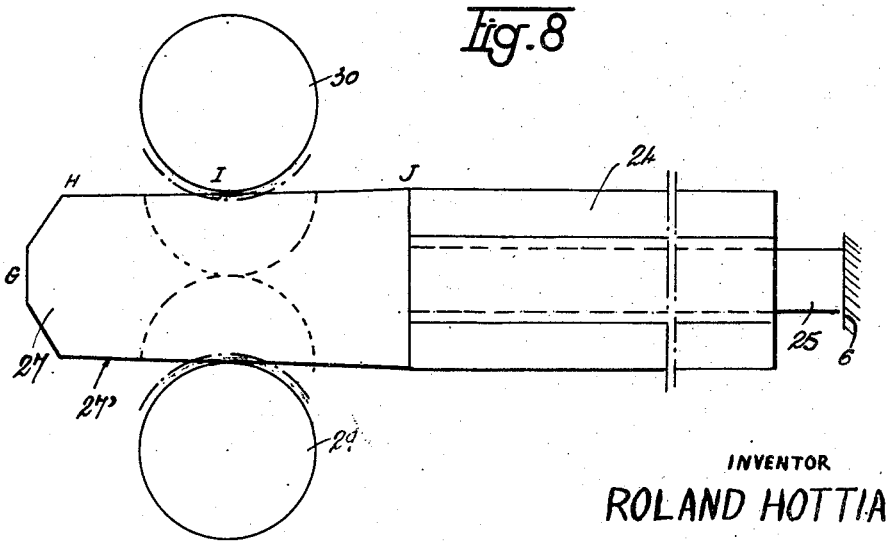

United States Patent Office 2,709,821
Patented June 7, 1955

2,709,821

SEMI-AUTOMATIC CONTROL DEVICE FOR THREADING MACHINES OF THE OPENING HEAD TYPE AND THE LIKE

Roland Hottiaux, Bogny (Braux), France

Application March 24, 1952, Serial No. 278,204

Claims priority, application France March 29, 1951

5 Claims. (Cl. 10—89)

The present invention has for its object to provide a semi-automatic control device for threading machines of the opening head type and the like. This device eliminates certain movements that are generally to be performed by hand and consequently obtains a greater production because the operator becomes thus free to feed a larger number of machines or else because he benefits by the automatic operation of the machine and may, during such an automatic operation, execute some useful auxiliary work.

Furthermore, the improved device produces a lesser strain on the operator who is no longer required to execute any manual operation or to develop any substantial effort.

The device according to the invention incorporates hydromechanical mechanisms operating under low pressure whereby it is possible to use as a driving fluid the actual machine watering or lubricating liquid. To this end, the machine according to the invention provides at least one of the following features:

A distributing slide valve subjected at one end to the action of a return spring and at the other end to the reaction of the to-and-fro movements of the carriage to which the work is secured, controls the distribution of a driving fluid into a cylinder inside which a piston is adapted to move for closing the screw-cutting head of the threading machine.

The piston closing the opening head of the threading machine is subjected on one hand to the action of a driving fluid and on the other hand to that of a return spring and, furthermore, if required, to the reaction of the forward movement of the work carriage.

The action of the driving fluid on the piston closing the screw-cutting head of the machine exerts on the said piston a thrust that overcomes the antagonistic pressure of the return spring and the resistance of the screw-cutting head against closing.

The piston closing the screw-cutting head produces at the end of the closing operation a reduction in the pressure prevailing inside the hydraulic circuit of the automatic control system.

A circuit-closing member controlled by the opening and closing movements of the screw-cutting head produces an interruption in the circulation of the driving or lubricating fluid towards the opening screw-cutting head of the machine and an increase in the pressure prevailing in the hydraulic circuit of the automatic control system.

The circuit of the driving or lubricating fluid towards the opening head of the machine is interrupted by the distributing slide valve during the introduction of the work inside the chasers of the screw-cutting head.

The driving fluid acts inside a cylinder inside which moves a piston providing for the recoil of the work carrage and its securing in its final rearmost position until the threaded work has been removed and a further threading operation is to be executed.

The clamping means for securing the work to the work-carriage are subjected on one hand to the action of a return spring and, on the other hand, to the action of the member mechanically controlled by the operator and opening said clamping means.

A control member actuated by the operator provides for the operation of the member opening the clamping means with a view to opening and closing subsequently the latter.

The operation of this control member by the operator produces a progression of the carriage with the work thereon towards the opening head of the machine.

During the forward movement of the carriage with the work thereon towards the opening head of the machine, the member opening the work clamping means bears on the closed clamping means and consequently on the carriage so as to move the latter to progress.

The carriage as it progresses and returns rearwardly, controls mechanically the shifting of the distributing slide valve together with the opening of the screw-cutting head of the machine.

The piston closing the opening head of the machine is provided with a spring-urged valve that may be controlled by the forward movement of the carriage in order to open the opening head of the machine, when the distributing slide valve operates faultily, so as to prevent the piston closing said head from being returned by its spring.

The pressure urging the return spring acting on the above-mentioned piston valve is defined in a manner such that the limit value of the pressure exerted on the member controlling the closing of the opening head of the machine through the agency of the head-closing piston may not rise above the value of the normal effort producing the closing of said opening head.

The complete automatic opening of the opening head of the machine at the end of the forward travel of the work carriage produces automatically the return movement of the carriage through the action of the driving fluid on the piston adapted to provide for this return movement if no abnormal resistance prevents such a return movement.

The action of the driving fluid on the piston closing the opening head of the machine produces automatically the closing of said head through hydraulic means together with the complete return movement of the carriage.

The arrangement produces in succession a reduction in the pressure prevailing in the hydraulic control circuit followed by the opening and closing under mechanical control means of the clamping means adapted to engage the work, and then the mechanically operated forward movement of the work carriage, the simultaneous stopping of the flow of the lubricating or driving fluid towards the opening head of the machine, the automatic mechanically operated opening of the head at the end of the forward stroke of the carriage, the cutting off of the flow of driving or lubricating liquid towards the opening head, the rise in pressure inside the hydraulic control circuit, the automatic hydraulically controlled rearward movement of the carriage, the closing of the opening head, the fastening of the carriage in its extreme rearward position under the action of hydraulic pressure, the arrangement being then ready for a further similar cycle of operations.

Further features of my invention will be disclosed in the following description given by way of exemplification and by no means in a limiting sense, reference being made to accompanying drawings, wherein:

Fig. 3 is a vertical cross-section of the hydraulic control arrangement through line III—III of Fig. 4.

Fig. 4 is a horizontal sectional view through line IV—IV of Fig. 3.

Fig. 5 is an elevational view of the control means for the circuit closing member illustrated cross-sectionally in Fig. 4.

Fig. 6 is a vertical sectional view through line VI—VI of Fig. 4.

Fig. 7 is an elevational front view of the clamping mechanism.

Fig. 8 is a diagrammatic plan view thereof.

Figure 1:
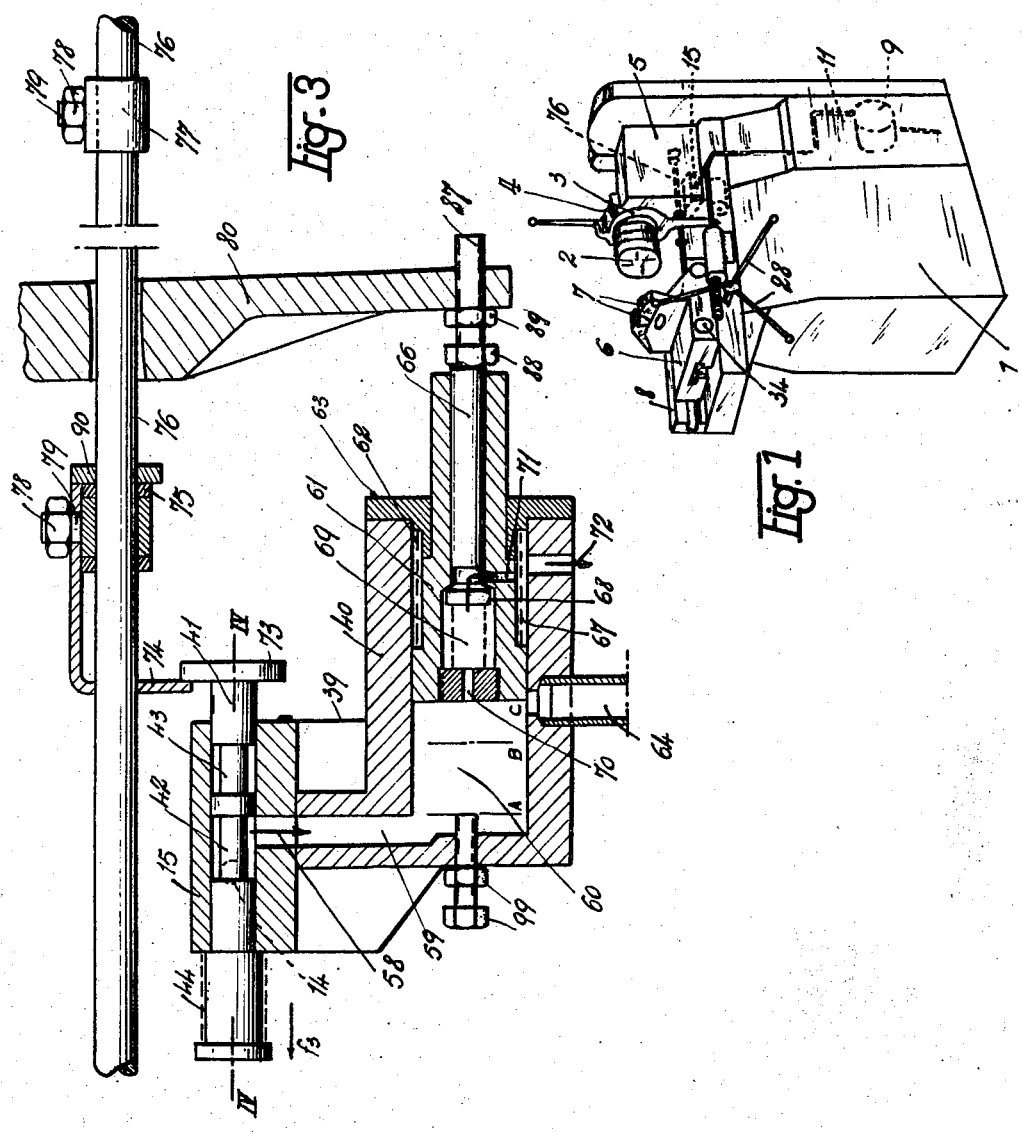
Fig. 1 is a general perspective view of a threading machine provided with an opening screw-cutting head, the protecting casing and the right hand slideway having been removed.

Turning to Fig. 1, 1 designates the frame of a threading machine the screw-cutting head of which is of the known opening type, and the parts of which are as follows: the head 2, the collar 3 controlling the opening and the closing of said head, said head being pivotally secured through the spindle 4 to the head-stock 5, and the carriage 6 carrying through the agency of the clamping means 7 the work to be threaded that is illustrated at 26; said carriage slides inside two slideways 8 of which only the left hand side slideway is illustrated.

Figure 2:
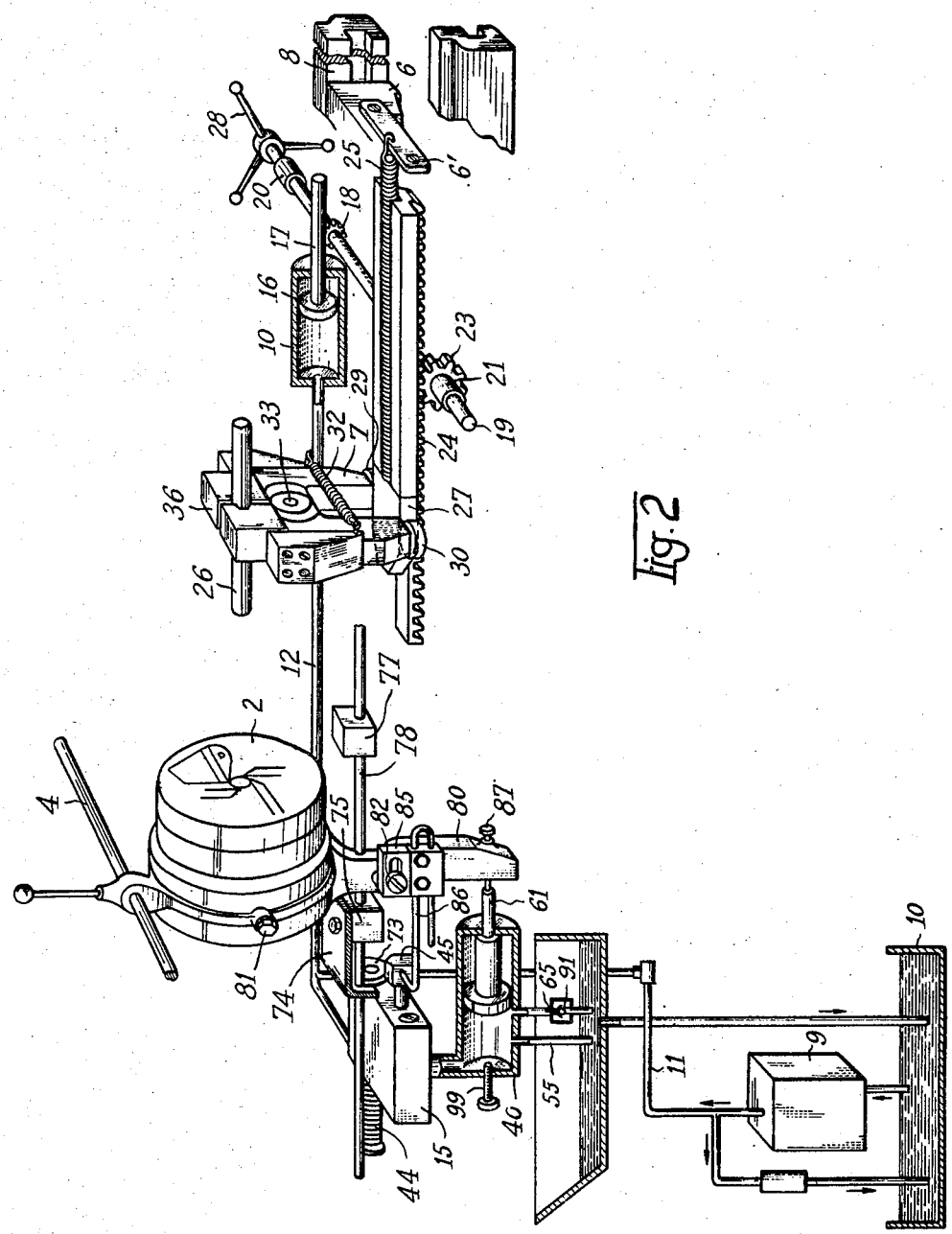
Fig. 2 is a diagrammatic general view of the hydraulic and kinematic transmission line of the machine.

The arrangement according to the invention includes as shown diagrammatically in Fig. 2, a pump 9 provided with a discharge valve that is not illustrated, said pump sucking oil or the like liquid out of a vat 10 and delivering it through the pipe 11 on one hand into the pipe 12 feeding a cylinder 13 and, on the other hand, into the pipe 14 feeding a distributor 15 shown with further detail in Figs. 3 to 6.

The cylinder 13 is rigid with the frame 1 of the threading machine. Inside said cylinder moves a piston 16 provided with a cylindrical rack 17 constituted by teeth extending round the periphery of the piston and meshing with a pinion 18 keyed to a spindle 19 adapted to freely revolve and to be shifted axially inside the bearings 20 and 21. Normally a spring 22 bearing on one hand against the bearing 21 and, on the other hand, against the spindle 19, urges axially the pinion 18 towards said bearing 21.

Furthermore, a pinion 23 keyed to said spindle 19 meshes with a rack 24 urged permanently in the direction of the arrow f1 by a spring 25 bearing through one end against the carriage 6 adapted to carry the work to be threaded 26 and through its other end against a wedge 27 rigid with the end of the rack 24 that is adapted to slide inside said carriage 6.

The free end of the spindle 19 carries three radial arms 28 or the like control member to be operated by a workman. A force exerted on the spindle 19 in the direction of the arrow f2 disengages the pinions 18 and 23 with reference to the racks 17 and 24 respectively so that the arms 28 may be set in an angular position which allows their easy operation by the workman.

The wedge 27 is engaged as illustrated in Figs. 2, 7 and 8 by two rollers 29 and 30 carried by spindles 31 at the lower ends of the corresponding jaws 7—7' of the clamping means adapted to hold the work 26 fast. A spring 32 urges the rollers 29 and 30 into contact with the wedge 27 to hold the latter between them. The jaws 7 and 7' are pivotally secured to a spindle 33 rigid with the carriage 6.

The carriage 6 is guided between two slideways 8 that serve as races for rollers 34 mounted on the carriage through the agency of spindles 35 (Fig. 7). Over the jaws 7—7' are provided auxiliary jaws 36 sliding inside a central groove provided in the jaws 7—7'; the locking of these jaws, between which is positioned the part to be threaded 26, is performed through the agency of the set screws 37 and their lateral adjustment is performed by means of the adjustable screws 38.

The distributor 15 (Figs. 3 to 6) is secured to the upper surface 39 of a cylinder 40 rigid with the frame 1. It includes a slide valve 41 slidingly carried inside the body of the distributor 15 and is provided at two points of its length with two sections of smaller diameter 42 and 43. A spring 44 urges constantly the slide valve in the direction of the arrow f3. The distributor 15 includes also a circuit closing member 45 (Fig. 4) also slidably carried inside the distributor body 15 and also provided with two sections 46—47 of a smaller diameter.

The oil arrives through the pipe 14 into the distributor 15 after which it passes as illustrated in Fig. 4 into successive channels 48 and 49 opening into a chamber 50 the inlet of which is closed by a ball 51 urged by a spring 52 onto its seat at the outlet of the channel 49. Said spring 52 engages on the other hand a plug 53 in the wall of the distributor body 15. From the chamber 50 an outlet pipe 54 communicates through the pipe 55 with the vat 10 (Figs. 2 and 6). On the other hand, the chamber 50 communicates with a chamber 56 inside which moves a section of reduced diameter of the circuit-closing member 45, said chamber 56 communicating in its turn through a channel 57 with the annular space surrounding the section of reduced diameter 43 of the slide valve 41 when the latter is urged back by its spring 44 as illustrated in Fig. 4. The oil passes out of the distributor into a pipe 58 which in accordance with the position occupied by the slide valve 41, communicates either with the chamber 50 through the circuit that has just been described or else directly with the pipe 14 through the annular space surrounding the section 42 of reduced diameter of the slide valve 41. From the pipe 58, the oil passes into a channel 59 (Fig. 3) leading into the cylindrical chamber 60 inside which moves a piston 61 that a spring 62 urges constantly towards the left hand side of Fig. 3. Said spring engages through its other end the cover 63 closing the chamber 60. A channel 64 is adapted to connect said chamber 60 with the vat 10 through the agency of the pipe 65. Inside the piston 61 there is provided a valve 66 the head 68 of which is urged by a spring 67 against its seat so as to close the connection between the chamber 69 formed inside the piston 61 and communicating through a channel 70 with the chamber 60, and a radial bore 71 formed in the piston and opening permanently into the channel 72 at the outside of the distributor.

The head 73 of the slide valve 41 is subjected as shown in Fig. 3 to the action of an abutment 74 carried by a clamp 75 secured to the disconnecting rod 76 carrying another clamp 77 and secured to the carriage 6. The clamps 75 and 77 are adjustable longitudinally of the rod 76 and may be adjustably secured thereto by means of nuts 78 screwed over studs 79 rigid with the clamps respectively.

The disconnecting rod 76 passes freely and with sufficient clearance through a tail-piece 80 rigid with the pivoting collar 3 mentioned hereinabove. Studs 81 rigid with the collar 3 transmit the opening and closing movements controlled by the latter to the screw-cutting head 2 of the machine (Fig. 2).

The tail-piece 80 carries also a spindle 82 rigid with an eccentric drum 83 provided with an annular groove 84 (Fig. 4), engaged by a hook-shaped member 85 forming the end of an elastic draw-rod 86 (Figs. 4 and 5), said draw-rod being fitted through its other end inside the head of the circuit-closing member 45.

The lower end of the tail-piece 80 carries an adjusting bolt 87 acting as a stop terminating with a head 88 and over which is screwed a locking nut 89 (Fig. 3).

The operation of the arrangement is as follows: the carriage 6 is supposed first to be at the extreme point of its rearward movement which is reached when the clamp 75 comes into contact with a stop 90 rigid with the frame 1 of the machine (Fig. 3). The oil exerts then its pressure on the piston 16 through the pipes 11 and 12 (Fig. 2), and said piston acts through the agency of the rack 17, of the pinion 18, of the spindle 19 and of the pinion 23 on the rack 24 that is constantly urged towards the carriage 6 by the spring 25, whereby the carriage is held in the above mentioned extreme position of its rearward movement, i. e. to the right hand side of Fig. 2, while the clamp 79 is also held against the stop 90.

On the other hand, the oil exerts a pressure on the piston 61 in the distributor so as to provide for the closing of the opening head, the oil passing through the pipe 14, the channels 48 and 49 (Fig. 4) and the chamber 60, and the thrust which is thus exerted is higher than the resistance created by the return spring 62 and the force required for closing the screw cutting head 2. The piston 61 is thus caused to move rearwardly and to close the opening head through the agency of the adjustable stop 87 and associated nut 89, the tail-piece 80 and pivoting collar 3.

This return movement is executed in two stages in the first place, when the piston 61 is shifted from A to B (Fig. 3), the screw cutting head 2 closes; the force transmitted through the tail-piece 80 and the collar 3 is then at a maximum; this being done and the piston 61 moving from B to C, the head 2 is locked in the usual manner and the force transmitted through 80 and 3 is now very small. When the piston 61 has arrived into the position C, it stops by reason of its abutting against the cover 63. The front surface of the piston uncovers then the opening registering with the pipe 64 which provides for a connection between the chamber 60 and the vat 10 through the agency of the pipe 65 inside of which is fitted a valve 91 (Fig. 2). The latter allows the pressure inside said pipe 65 to remain at the pressure P' that is lower than the pressure P prevailing ahead previously throughout the circuit under the action of the pump 9. This pressure P' is selected in a manner such that the piston 61 may be urged against the cover 63. At this moment, the same reduced pressure P' prevails also at 59 and also in the annular space surrounding the reduced section 42 of the slide valve 41. The same pressure also prevails in the pipe 12 i. e. inside the cylinder 13, which is sufficient to hold the carriage and consequently the slide valve 41 in its starting position illustrated in Fig. 3. At this moment, the radial arms 28 are operated in the direction of the arrow f4 which, by reason of the carriage 6 being held fast by the stop 90 causes the rack 24 and consequently the wedge 27 to move rearwardly; the wedge moving thus rearwardly together with the rack, the rollers 29 and 30 pass from the position locking the work 26, as illustrated in solid lines in Fig. 8, into the position shown in dot-and-dash lines corresponding to the sudden opening of the jaws of the clamping means. In the position illustrated in solid lines in Fig. 8, the work is supposed to be locked as provided by forcing the wedge 27 between the rollers 29 and 30 over the distance H I, the point I depending on the diameter of the work.

When it is desired to open the jaws, the wedge 27 carried along by the rack 24 which is driven itself by the parts 25, 22 and 28, is moved in the opposite direction and releases the rollers 29 and 30 and thereby the work to be threaded is set free; this being done, this movement along the oblique line H G allows the rollers to pass suddenly from the released position shown in dot-and-dash lines into the position of maximum opening shown in dotted lines. The workman removes then the work 26 and replaces it by a further work and allow the radial arms 28 to return into their original position under the action of the spring 25. This produces a reversal, a speedy closing of the jaws 7—7' and then a fastening thereof over the work. The resulting clamping action is caused by the spring 25 and by the sloping surface 27' of the wedge 27. It is therefore adjustable but independent of the action of the operator.

The operator continues then revolving the radial arms 28 in a direction opposed to that of the arrow f4; the wedge 27 then engages the rollers 29 and 30 and consequently urges the carriage 6 forwardly, which causes the work 26 to engage the screw-cutting head 2. The operator then releases the radial arms 28.

During the forward movement of the carriage 6 and by reason of the movement of the work to be threaded, the slide valve 41 urged back by its spring 44 follows the forward movement of the carriage.

The oil intended for lubricating or watering the work during its machining, starts flowing again only when the pipe 14 begins to communicate with the channel 48, which furthers substantially the introduction of the work inside the chasers in the head 2, chiefly in the particular case of a floating threading operation which requires a manual centering of the free end while the risk of frequent breakage of the chasers is cut out. As a matter of fact, the lubricating oil is fed by the channel 48 in the distributor 15 (Fig. 6) into the channel 92 and the pipes 93—94 which lead to the screw-cutting head 2. In these pipes are mounted two control cocks 95 and 96. Now, when the slide valve 41 is in the position referred to hereinabove, it closes the end of the channel 48 and prevents the oil fed by the pump 9 from flowing through the lubricating circuit 93—94. During the movement of the carriage 6, the disconnecting rod 76 is carried along with it.

The abutment 74 carried by the clamp 78 releases the head 73 of the slide valve 41 which latter is then urged rearwardly by its spring 44 and moves towards the position illustrated in Fig. 4.

Towards the end of this movement, the opening of the channel 48 is uncovered and the lubricating oil begins flowing again through the nozzle 97 at the end of pipe 94. At the same time, the connection between the channel 57 and the channel 58—59 is no longer interrupted by the slide valve 41 and the oil may flow out of the chamber 60 in the cylinder 40, through the channels 59 and 58, into the channel 57, the chamber 50, the channel 54 and thence, through the pipe 55, it returns into the vat 10. The head closing piston under the action of its return spring returns to its starting position.

The carriage 6 continues its progression and the threading operation on the work 26 is performed inside the head 2. When the operation is at an end, the clamp 77 on the bar 76 abuts against the tail-piece 80 and, through a rocking movement of the collar 3, provides for the opening of the head 2. At this moment, and through the agency of the eccentric drum 83 and of the draw rod 86, the circuit closing member 45 is driven forwardly and engages the distributor body 15 as shown in Fig. 4. The circuit-closing member 45 closes the channel 48 and the lubricating oil no longer flows through the pipes 92, 93, 94 and the nozzle 97. The pressure in the pipes 14 and 12 rises until it reaches the maximum pressure P. This high pressure is transmitted to the piston 16 which is driven rearwardly. The carriage 6 moves rearwardly until the clamp 75 engages the stop 90. At the end of this return movement, the slide valve 41 driven by the abutment 74 on the clamp 75 returns to the position illustrated in Fig. 3. The communication is then restored between 14 and 59 and the piston 61 is shifted in a direction opposed to that referred to hereinbefore i. e. it moves towards the right hand side of Fig. 3 in order to produce as already disclosed the closing of the head 2. During this closing movement, the eccentric drum 83 occupies in succession the positions 83''', 83'' and 83', shown in Fig. 5. Between the position 83'' and the position 83' the draw rod 86 has made the circuit closing member 45 return engaging a stop 98 (Fig. 5). The opening of the channel 48 is then connected again with the circuit 92 to 94 and the preceding cycle of operation may begin over again.

The pressure with which the spring 67 urges the valve 66 into its closed position is defined in a manner such that the thrust exerted on the abutment 87 may not rise beyond a limit value corresponding to the normal force to be exerted for closing the screw-cutting head 2.

This arrangement is of interest when any faulty operation due for instance to an abnormally high gumming occurs during the return movement of the slide valve 41 under the action of the spring 44.

The piston 61 remains then in its closing position and when, at the end of the threading operation, the clamp 77 urges the collar 3 into its head opening position as shown, the stop 87 causes the valve 66—68 to compress the spring 67. The connection is then opened between the chamber 60 and the outer atmosphere through 70, 69, 71, 72. The piston 61 then follows, after a very small delay, the movement of the valve 66—68 and the collar 3 may open the head 2 but in an incomplete manner however because the end of the opening movement of the head is controlled by an elastic arrangement of small power and therefore, the collar 3 stops as soon as the chasers on the head have released the work 26 under such conditions. The eccentric drum 83 cannot reach the position 83''' and the circuit closing member 45 closes incompletely the channel 48 so that the return movement of the carriage 6 cannot be performed. This warns the operator that something is wrong with the operation.

The stops 99 and 87 (Fig. 3) and the eccentric drum 83 serve for adjusting the machine when a substantial wear in the ring closing the head 2 becomes apparent.

The ball 51 forms a discharge valve when a partial or complete closing of the lubricating circuit 92—93 by the cock 95 causes the oil to be deflected through 54 and 55 back into the vat 10.

There is also provided a valve cock 96 for controlling 94 while 100 designates a valve for adjusting the return speed of the carriage through adjustment of the output of oil inside the pipe 12.

It should be noted that the stopping of the flow of lubricating or watering liquid is performed in two stages:

1. At the moment of the opening of the head under the action of the opening stop 87, the closing member 45 closes the channel 48 so that the liquid ceases flowing and the carriage moves rearwardly.

2. At the end of the return movement, the slide valve 41 assumes the position illustrated in Fig. 3 and closes the connection between the channels 14 and 48; the head 2 closes; the circuit-closing member 45 reopens the channel 48 but, as the latter is no longer fed through 14, the interruption of the flow of liquid continues until the carriage has advanced by a length sufficient for the slide valve 41 to restore the connection between the channels 14 and 48. This length of travel serves for introducing the work into the screw cutting head.

It should be further noted that, as soon as the slide valve 41 establishes a connection between 58 and 57, the piston 61 closing the screw cutting head returns into the position A illustrated in Fig. 3 under the action of its return spring 62.

It is only in the case of damage preventing the return of the slide valve 41 that the head closing piston 61 remains in its position C until the carriage has caused the valve 66 to move rearwardly through the agency of transmission 77—80 and 83 which leads to a forced return movement of the piston 61 and to the partial opening of the screw cutting head 2. During such an abnormal operation, the liquid ceases flowing through the nozzle 97.

It should be remarked that the clamping jaws 7—7' exert a direct clamping action by reason of the pressure of the spring 25.

When the work is introduced between the chasers of the opening head, it is necessary to exert a force that is all the higher when the unfavorable factors of the resistant torque applied to the work are greater, these factors being the hardness of the metal, the magnitude of the pitch, the degree of engagement of the chasers, the grade of the grinding and the like.

Now it has been shown that this force is entirely transmitted through the radial arms 28 to the wedge 27. This produces in the clamping jaws an extra power. Consequently the jaws 7—7' produce a further clamping action. At the moment of its introduction into the thread-cutting head, the work to be threaded is locked all the better by the clamping jaws when the force required for the operation of the screw cutting head is larger.

What I claim is:

1. In a threading machine, the combination of a carriage adapted to carry the work to be threaded, an opening screw-cutting head including chasers, and a semi-automatic control device for said carriage and opening head comprising a hydraulic circuit, a cylinder connected to said hydraulic circuit, a piston slidably mounted in said cylinder, a member operatively connected to said piston and controlling the closing of said opening head, a distributing slide valve interposed in said circuit for controlling the admission of the driving fluid into said cylinder, resilient means normally acting on said slide valve to return it into a predetermined position for opening said circuit, further resilient means exerting on said piston a thrust operating against the fluid pressure within said cylinder with said fluid pressure being higher than the pressure exerted by said last mentioned resilient means and than the force required for closing said opening head, means for reducing the pressure of the fluid inside said circuit at the end of the closing movement of the opening head, a circuit closing member connected to said head and controlled by the opening of said head for producing a rise in the pressure inside the fluid circuit for a predetermined position of said circuit-closing member, a second cylinder arranged for being fed by said circuit in parallel with said first cylinder, a piston slidingly carried in said second cylinder and connected to said work carriage for urging the same rearwardly and holding it in its rearmost position until the threaded member has been removed upon the increase by said circuit closing member of the pressure of the fluid in said circuit connected to said second cylinder, jaws for holding the work mounted on said carriage, resilient means normally urging said jaws into their closed position, a member capable of opening said jaws, means for controlling said member for opening and closing said jaws and for urging said carriage forwardly with the work thereon towards said opening head, means mechanically connecting said carriage and said slide valve for moving said valve upon movement of said carriage for causing the opening of the screw-cutting head, and means for controlling the driving fluid and causing the rearward movement of said second piston and of said carriage during the opening of said opening head at the end of the forward stroke of said carriage.

2. In a threading machine, the combination of a carriage adapted to carry the work to be threaded, an opening screw-cutting head including chasers and a semi-automatic control device for said carriage and opening head comprising a hydraulic circuit, a cylinder interposed in said circuit, a piston reciprocating in said cylinder, a member operatively connected to said piston and controlling the closing of said opening head, a distributing slide valve interposed in said circuit for controlling the admission of the driving fluid into said cylinder, resilient means normally acting on said slide valve to return it into a predetermined position for opening said circuit, further resilient means exerting on said piston a thrust operating against the fluid pressure within said cylinder with said fluid pressure being higher than the pressure exerted by said last mentioned resilient means and than the force required for closing said opening head, means for reducing the pressure of the fluid inside said circuit at the end of the closing movement of said opening head, a circuit-closing member connected to said head and controlled by the opening of said head and producing a rise in the pressure inside said fluid circuit for a predetermined position of said circuit-closing member, a second cylinder arranged for being fed by said circuit in parallel with said first cylinder, a piston slidingly carried in said second cylinder and connected to said work carriage for urging the same rearwardly and holding it in its rearmost position until the threaded member has been removed upon the increase by said circuit closing member of the pressure of the fluid in said circuit connected to said second cylinder, jaws for holding said work mounted on said carriage, resilient means normally urging said jaws into their closed position, a member capable of opening said jaws and adapted for being mechanically operated by hand, means connecting said jaw opening member and said carriage for causing the progression of said carriage towards said opening head and controlled by the engagement between said jaw-opening member and the closed jaws, means mechanically connecting said carriage and said slide valve for moving said valve upon movement of said carriage and for causing the opening of said screw-cutting head, and means for controlling the driving fluid and causing the rearward movement of said second piston and of said carriage during the opening of said opening head at the end of the forward stroke of said carriage.

3. In a threading machine, the combination of a carriage adapted to carry the work to be threaded, an opening screw-cutting head including chasers, and a semi-automatic control device for said carriage and said opening head comprising a hydraulic circuit associated with an auxiliary lubricating circuit, a cylinder interposed in said hydraulic circuit, a piston slidably mounted in said cylinder for being moved by fluid pressure from said circuit, a member connected to said piston and said opening head for controlling the closing and opening of said head upon movement of said piston, a distributing slide valve connected to said circuit for controlling the admission of the driving fluid into said cylinder, resilient means normally acting on said slide valve to return it to a predetermined position for opening said circuit, further resilient means exerting on said piston a thrust operating against the fluid pressure in said cylinder with said fluid pressure normally being higher than the pressure exerted by said last mentioned resilient means and the force required for closing said opening head, means for reducing the pressure of the fluid inside said circuit at the end of the closing movement of said opening head, a circuit-closing member connected to said head and controlled by the opening of said head for producing a rise in the pressure inside said fluid circuit simultaneously with the cutting-off of the auxiliary lubricating circuit at a predetermined position of said circuit-closing member, means for cutting off said lubricating circuit connected to and controlled by said distributing slide valve when in the position occupied by it when the work is being introduced inside the chasers of the opening head, a second cylinder connected to and fed by said circuit in parallel with said first cylinder, a piston slidingly carried in said second cylinder and connected to said work carriage for urging the same rearwardly and to hold it in its rearmost position until the threaded member has been removed upon the increase by said circuit closing member of the pressure of the fluid in said circuit connected to said second cylinder, jaws adapted for holding the work mounted on said carriage, resilient means normally urging said jaws into their closed position, a member capable of opening said jaws, means for controlling said member for opening and closing said jaws and for urging said carriage forwardly with the work thereon towards said opening head, means connected to said carriage for engaging said head opening means and opening said head upon the completion of the forward movement of said carriage and means for controlling the driving fluid and causing the rearward movement of said second piston and of said carriage during the opening of said opening head at the end of the forward stroke of said carriage.

4. In a threading machine, the combination of a carriage adapted to carry the work to be threaded, an opening screw-cutting head including chasers, and a semi-automatic control device for said carriage and opening head comprising a hydraulic circuit associated with an auxiliary lubricating circuit, a cylinder interposed in said hydraulic circuit, a piston slidably mounted in said cylinder, a member operatively connected to said piston and controlling the closing of said opening head, a distributing slide valve interposed in said circuit for controlling the admission of the driving fluid into said cylinder, resilient means normally acting on said slide valve to return it into a predetermined position opening said circuit, further resilient means normally exerting on said piston a thrust operating against the fluid pressure within said cylinder with said fluid pressure being higher than the pressure exerted by said last mentioned resilient means and the force required for closing said opening head, means for reducing the pressure of the fluid inside said circuit at the end of the closing movement of said opening head, a circuit closing member connected to said head and controlled by the opening of said head for producing a rise in the pressure inside said fluid circuit simultaneously with the cutting off of said auxiliary lubricating circuit for a predetermined position of said circuit-closing member, means for cutting off said lubricating circuit connected to and controlled by said distributing slide valve when in the position occupied by it when the work is being introduced inside the chasers of said opening head, a second cylinder arranged for being fed by said circuit in parallel with said first cylinder, a piston slidingly carried in said second cylinder connected to said work carriage for urging the same rearwardly and holding it in its rearmost position until the threaded member has been removed upon the increase by said circuit closing member of the pressure of the fluid in said circuit connected to said second cylinder, jaws adapted to hold said work and mounted on said carriage, resilient means normally urging said jaws into their closed position, a member for opening said jaws adapted to be mechanically operated by hand, means connecting said jaw opening member and said carriage for causing the progression of said carriage towards said opening head and being controlled by the engagement between said jaw-opening member and the closed jaws, means mechanically connecting said carriage and said slide valve for moving said slide valve upon movement of said carriage and for causing the opening of said screw-cutting head, means for controlling the driving fluid for operating the rearward movement of said second piston and of said carriage through the opening of said opening head at the end of the forward stroke of said carriage.

5. In a threading machine, the combination of a carriage adapted to carry the work to be threaded, an opening screw-cutting head including chasers and a semi-automatic control device for said carriage and opening head comprising a hydraulic circuit associated with an auxiliary lubricating circuit, a cylinder interposed in said hydraulic circuit, a piston slidably mounted in said cylinder and provided with an axial passageway, a member connected to and controlled by said piston and controlling the closing of said opening head, a distributing slide valve interposed in said hydraulic circuit for controlling the admission of the driving fluid into said cylinder, resilient means normally acting on said slide valve for returning the same into a predetermined position opening said hydraulic circuit, further resilient means normally exerting on said piston a thrust operating against the fluid pressure in said cylinder with said fluid pressure being higher than the pressure exerted by said last mentioned resilient means and the force required for closing said opening head, means for reducing the pressure of the fluid inside said hydraulic circuit at the end of the closing movement of said opening head, a circuit-closing member connected to and controlled by the opening of said head and producing a rise in the pressure inside said fluid circuit simultaneously with the cutting off of the auxiliary lubricating circuit for a predetermined position of said circuit-closing member, means for cutting off said lubricating circuit connected to and controlled by said distributing slide valve when in the position occupied by it when the work is being introduced inside the chasers of the opening head, a second cylinder arranged for being fed by said circuit in parallel with said first cylinder, a piston slidingly mounted in said second cylinder connected to said work carriage for urging the same rearwardly and holding it in its rearmost position until said threaded member has been removed upon an increase in pressure within said circuit connected to said second cylinder, jaws adapted to hold said work mounted on said carriage, resilient means normally urging said jaws into their closed position, a member for opening the jaws adapted to be mechanically operated by hand, means connecting said jaw opening member and said carriage for causing the progression of said carriage towards said opening head and being controlled by the engagement between said jaw-opening member and the closed jaws, means for mechanically driving said slide valve and connected to and controlled by the reciprocating movement of said carriage, a valve for closing the passageway through the piston and controlling the closing of said opening head, means for shifting said valve into its open position when said carriage advances to open said screw-cutting head, a spring normally urging said valve back into its closed position and gauged so that the thrust exerted on said member closing said opening head may not rise beyond a predetermined value corresponding to the normal closing stress required for the closing of said head, means automatically controlling said second piston for returning said carriage rearwardly through the opening of said opening head.

References Cited in the file of this patent

UNITED STATES PATENTS

| | | |
|---|---|---|
| 2,318,177 | Mathisa | May 4, 1943 |
| 2,551,517 | Webb | May 1, 1951 |